(12) United States Patent
Fukuda

(10) Patent No.: US 11,174,928 B2
(45) Date of Patent: Nov. 16, 2021

(54) DIFFERENTIAL DEVICE WITH TWO-STEP ABILITY TO LIMIT DIFFERENTIAL MOTION

(71) Applicant: GKN Automotive Limited, Birmingham (GB)

(72) Inventor: Hiromichi Fukuda, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 16/891,315

(22) Filed: Jun. 3, 2020

(65) Prior Publication Data

US 2020/0292045 A1 Sep. 17, 2020

Related U.S. Application Data

(63) Continuation of application No. PCT/JP2017/043464, filed on Dec. 4, 2017.

(51) Int. Cl.
*F16H 48/00* (2012.01)
*F16H 48/14* (2006.01)
*F16H 48/36* (2012.01)

(52) U.S. Cl.
CPC ......... *F16H 48/147* (2013.01); *F16H 48/145* (2013.01); *F16H 2048/366* (2013.01)

(58) Field of Classification Search
CPC ................. F16H 48/147; F16H 48/145; F16H 2048/366; F16H 48/08; F16H 48/36;
(Continued)

(56) References Cited

U.S. PATENT DOCUMENTS

| 5,098,360 | A | 3/1992 | Hirota |
| 10,851,843 | B2 * | 12/2020 | Shibata ................... F16H 48/38 |

(Continued)

FOREIGN PATENT DOCUMENTS

| JP | H03129150 A | 6/1991 |
| JP | H0825995 A | 1/1996 |

(Continued)

OTHER PUBLICATIONS

International Search Report and Written Opinion for PCT/JP2017/043464 dated Mar. 6, 2018 (6 pages; with English translation).

*Primary Examiner* — Victor L MacArthur
(74) *Attorney, Agent, or Firm* — Bejin Bieneman PLC

(57) ABSTRACT

A differential device is provided with: an input member; a gear set with output gears to transmit torque from the input member to the output gears while allowing differential motion therebetween; a first clutch for limiting the differential motion; a first pressure pressing on the first clutch; a first cam mechanism for pressing the first pressure plate toward the first clutch; a second clutch, when connected, drivingly connecting the output gears with the input member; a second pressure plate for engaging the second clutch; and a rotatable driver disk including a pressing member so coupled with the cam mechanism as to, from a first position to a second position, rotate the first cam mechanism together and to, from the second position to a third position, allow the first cam mechanism to create rotational difference relative to the pressing member, thereby engaging the second clutch.

7 Claims, 7 Drawing Sheets

(58) Field of Classification Search
CPC .. F16H 48/285; F16H 48/24; F16D 2023/123; F16D 23/12
See application file for complete search history.

(56) References Cited

U.S. PATENT DOCUMENTS

2012/0053002 A1   3/2012  Schmidt et al.
2017/0198800 A1*  7/2017  Onitake ................. F16D 11/14

FOREIGN PATENT DOCUMENTS

| JP | 2007-139147 A | 6/2007 |
| JP | 2012-512996 A | 6/2012 |

* cited by examiner

DIFFERENTIAL DEVICE WITH TWO-STEP ABILITY TO LIMIT DIFFERENTIAL MOTION

CROSS-REFERENCE TO RELATED APPLICATIONS

This application is a continuation of, and claims priority to, Patent Cooperation Treaty Application No. PCT/JP2017/043464, filed on Dec. 4, 2017, which application is hereby incorporated herein by reference in its entirety.

BACKGROUND

As right and left axles in a vehicle do not necessarily rotate in an equal speed, it is required to allow differential motion therebetween. To transmit torque to both the axles with enabling differential motion therebetween, a differential device is used.

In a case where either a right or left driving wheel loses traction, the differential device will run idle and then lose an ability to transmit torque even to the other driving wheel. To avoid such a situation, some differential devices comprise mechanisms for limiting differential motion. One example thereof is a limited slip differential (LSD) which uses a friction clutch. An electronically controlled LSD could also be used, which uses a device for applying pressure force to its friction clutch and an electronic device for controlling the device in combination. Possible as the pressure device are hydraulic and cam mechanisms.

On the other hand, a so-called free-running differential can controllably connect and shut off a differential device from a propeller shaft, which is for example used for switching between a two-wheel mode and a four-wheel mode. A friction clutch in combination with a pressure device is often used for such connection and shut-off therein. A device in which an electronically controlled LSD is combined with a free-running differential has been proposed, which comprises independent two sets of friction clutches and pressure devices. Published Japanese translation of PCT International Publication for Patent Application No. 2012-512996 discloses a related art.

SUMMARY

The disclosure herein relates to a differential device with a two-step ability to limit differential motion, and in particular to a differential device capable of limiting differential motion at a first step and locking it at a second step.

A friction clutch is suitable for limiting differential motion, whereas it is not adaptable to use for locking a differential device because it starts slippage when it receives torque above its threshold depending on an applied pressure force. In contrast, a dog clutch is suitable for locking a differential device, whereas it cannot be used for limiting differential motion because it cannot allow slippage. Use of these two clutches in combination of driving devices respectively applied thereto may enable a differential device freely selectable between limiting and locking differential motion, but is expected to terribly complicate its structure. A complicated structure is, of course, disadvantageous in terms of reliability and weight.

The following disclosure relates to a device using only one actuator to realize both limiting and locking differential motion.

According to an aspect, a differential device is provided with: an input member receiving torque to rotate about an axis; a gear set including output gears rotatable about the axis, the gear set being so coupled with the input member as to mediate transmission of the torque from the input member to the output gears while allowing differential motion between the output gears; a first clutch so coupled with the input member and the output gears as to limit the differential motion; a first pressure plate axially adjacent to the first clutch and axially movable to press on the first clutch; a first cam mechanism adjacent to the first pressure plate to press the first pressure plate toward the first clutch; a second clutch, when connected, drivingly connecting the output gears with the input member; a second pressure plate axially adjacent to the second clutch and axially movable to engage the second clutch; and a driver disk capable of making a rotational motion from a first position via a second position to a third position, the driver disk including a pressing member so coupled with the cam mechanism as to, from the first position to the second position, rotate the first cam mechanism together and to, from the second position to the third position, allow the first cam mechanism to create rotational difference relative to the pressing member, and in combination with the second pressure plate constituting a second cam mechanism to engage the second clutch.

DESCRIPTION OF EXAMPLARY EMBODIMENTS

Exemplary embodiments will be described hereinafter with reference to the appended drawings. Throughout the following description and the appended claims, an axis means a rotational axis of a differential device, an axial direction means a direction parallel thereto and a radial direction means a direction perpendicular thereto unless otherwise described. The rotational axis ordinarily agrees with rotational axes of cam mechanisms and a driver disk but agreement is not necessary. Further, while distinctions between the right and the left will made for the convenience of explanation, these distinctions do not limit possible embodiments.

While a differential device of a bevel gear type will be described hereafter as an example, what the present specification discloses is generally applicable to any gear device mediating torque transmission from an input member to output gears while allowing differential motion therebetween, such as a differential device of a face-gear type or a planetary gear type.

Figure 1:
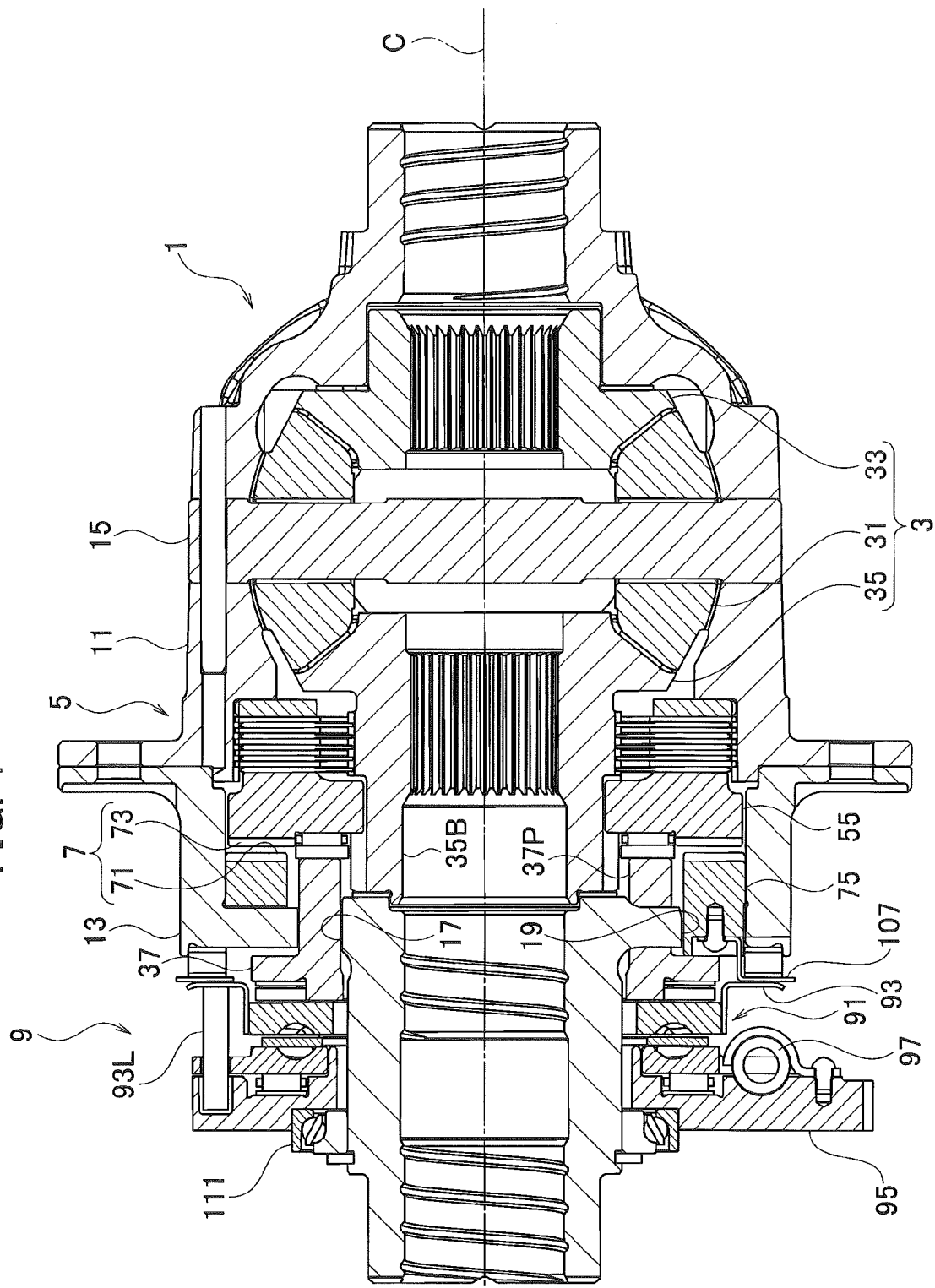
FIG. 1 is an elevational sectional view of a differential device according to an embodiment.

Referring mainly to FIG. 1, the differential device is generally provided with a casing 1 as an input member, a differential gear set 3 which transmits torque while allowing differential motion, a first clutch 5 for limiting the differential motion, a second clutch 7 for locking up the differential motion, and an actuator 9 for putting these clutches in action.

The casing 1 houses the differential gear set 3 and as well acts as an input member that receives torque from an engine/motor to rotate about an axis C. The casing 1 may be so structured as to be dividable into multiple members to expose the interior for convenience of installation of various components therein, and is for example dividable into a main body 11 and a cover 13. For the convenience of coupling the cover 13 with the main body 11, these members may be provided with flanges for example, which radially outwardly spread and are as well applicable to coupling with a ring gear for receiving the torque. Of course, any other structure is applicable to coupling and any other portion of the casing 1 is applicable to receive the torque.

In the casing 1, the main body 11, for example, is on its periphery provided with through-holes for coupling with a shaft 15, which is secured to the main body 11 by means of a pin or such. In the casing 1, the cover 13, for example, is on its side face provided with through-holes 17, 19 for communicating the clutches 5, 7 with the actuator 9.

The differential gear set 3 is in general provided with a plurality of pinions 31 and side gears 33, 35 respectively meshing with the pinions 31. The pinions 31 are so supported by the shaft 15 in a way as to be rotatable thereabout, and receive torque via the shaft 15 from the casing 1.

The side gears 33, 35 are output gears, which respectively have structures such as splines in order to couple with axles, to output the torque to both the axles. More specifically, the differential gear set 3, via engagements among the gears, mediates transmission of the torque from the casing 1 as an input member to the side gears 33, 35 as output gears while allowing differential motion therebetween.

One of the side gears 33, 35, a boss portion 35B of the left side gear 35 for example, is preferably elongated in the axial direction to serve for coupling with the first clutch 5, particularly for engagement in the circumferential direction with inner plates 53 or pressure plates 55 described later.

Figure 2A:
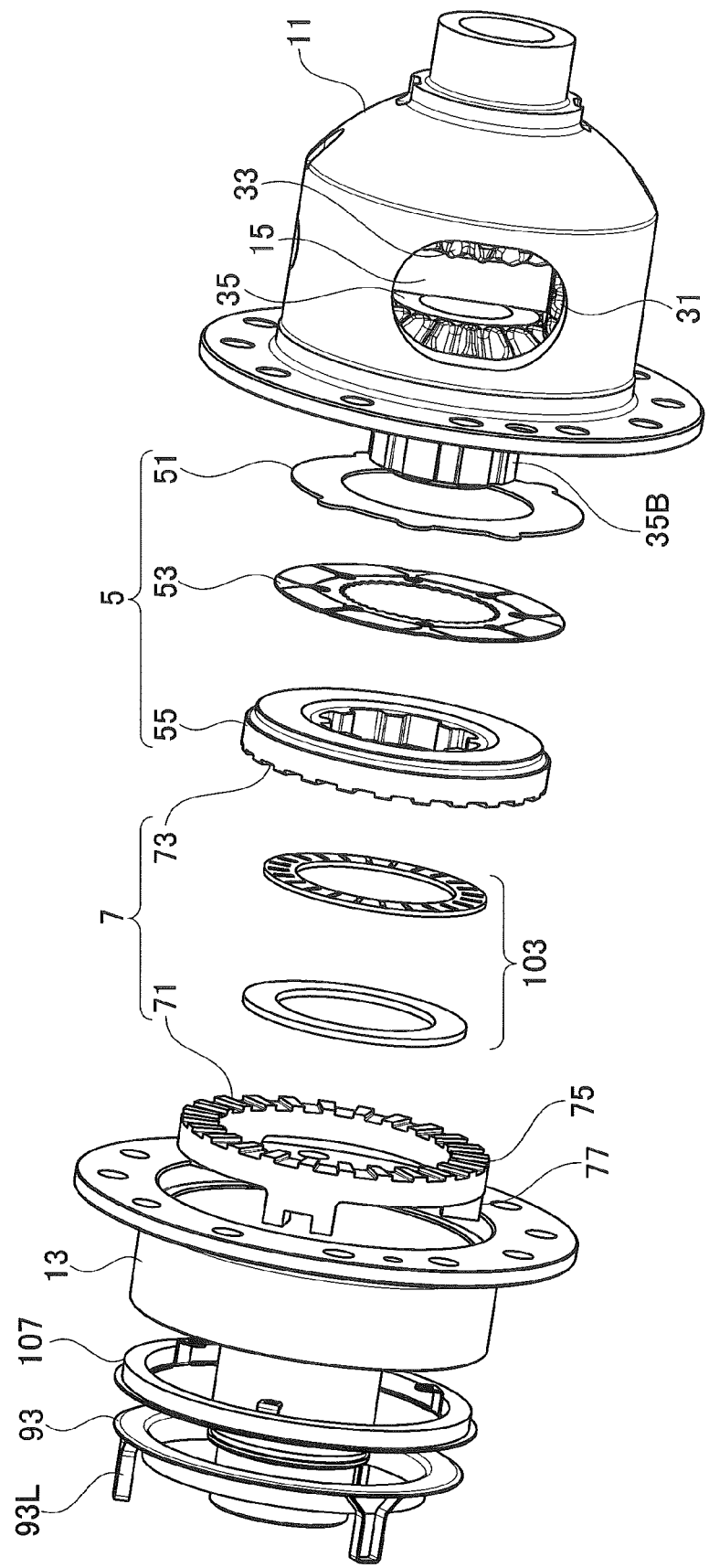
FIG. 2A is a partial exploded perspective view of the differential device, which mainly shows first and second clutches.

Referring to FIG. 2A in combination with FIG. 1, the first clutch 5 is preferably a friction clutch composed of a pair of, or more, friction plates mutually applying friction, and is for example a multi-plate clutch comprising a plurality of outer plates 51, a plurality of inner plates 53 and a pressure plate 55. Plural pairs of the outer plates 51 and the inner plates 53, although only one pair is visible in FIG. 2A, are alternately arranged in the axial direction, where the outer plates 51 are engaged with the casing 1 by means of lugs or such and the inner plates 53 the boss portion 35B. In addition, the plates 51, 53, 55 are all slightly movable in the axial direction, and the pressure plate 55 is axially adjacent to and thereby capable of pressing the plates 51, 53. When the pressure plate 55 slightly moves toward the plates 51, 53 and then applies pressure thereto, the plates 51, 53 come to frictionally brake the side gear 35 relative to the casing 1 and therefore limit its differential motion.

In the casing 1 further housed is a clutch member 75, which is movable in the axial direction. A face of the clutch member 75, which faces the pressure plate 55, is toothed to form first clutch teeth 71, and a combination thereof and second clutch teeth 73 in mesh therewith constitutes the second clutch 7. The second clutch teeth 73 may be formed on a component separate from the pressure plate 55 or formed on and as a unitary body with the pressure plate 55. In any case, the separate component or the pressure plate 55 becomes engaged with the boss portion 35B of the side gear 35 by means of lugs or such.

Figure 7:
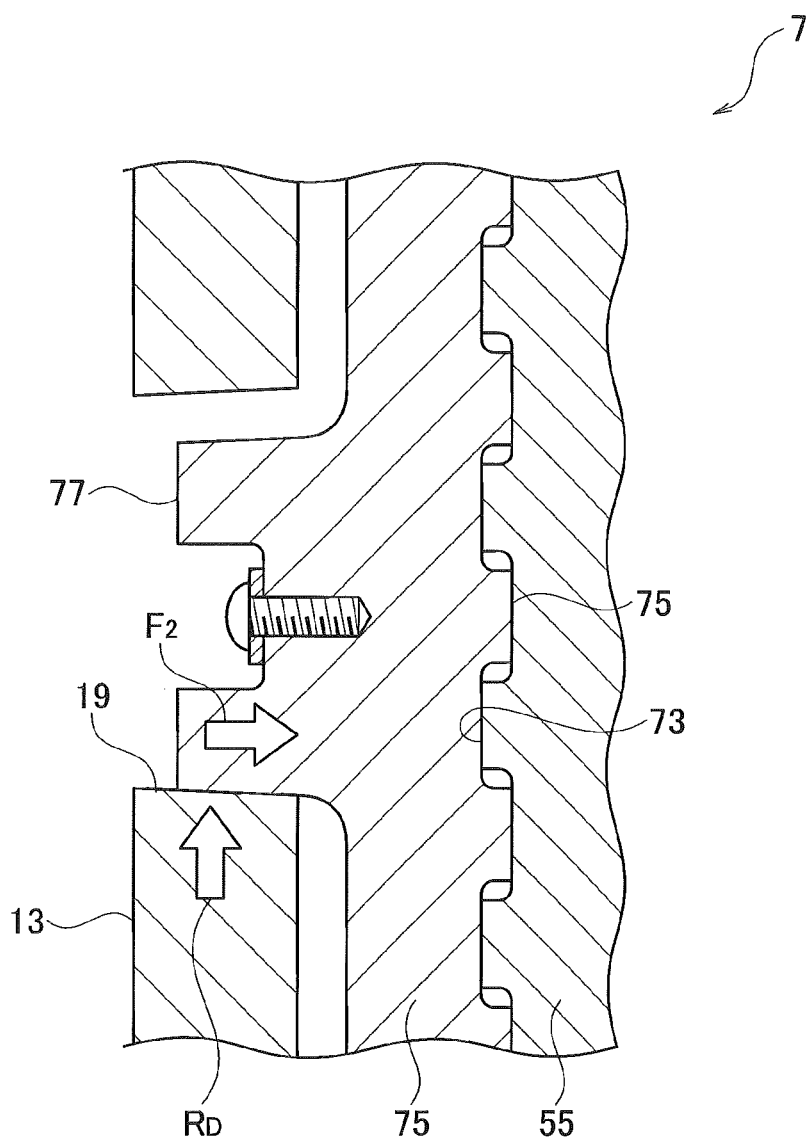
FIG. 7 is a partial sectional view of the differential device, which mainly shows the second clutch and a through-hole of a casing, in a state where an arm is in contact with a wall surface of the through-hole.

From a face of the clutch member 75 opposed to the first clutch teeth 71, plural legs 77 stand axial-symmetrically and extend in the axial direction, which respectively fit in and engage with the through-holes 19 of the cover 13, as best shown in FIG. 7 in particular. Respective ends of the legs pass through the through-holes 19 to get exposed to the exterior and may be combined with a ring 107 outside the casing 1 by mean of bolts or such. The ring 107 serves for communication with a second cam mechanism 101 as will be described later.

When the clutch member 75 moves in the axial direction toward the pressure plate 55 and consequently the clutch teeth 71, 73 get engaged mutually, the second clutch 7 by means of the engagement of the legs 77 with the cover 13 makes the side gear 35 drivingly combine with the casing 1, whereby prohibiting differential motion (locking up the differential gear). To promote disengagement, any return spring may be interposed between the ring 107 and the cover 13.

Figure 2B:
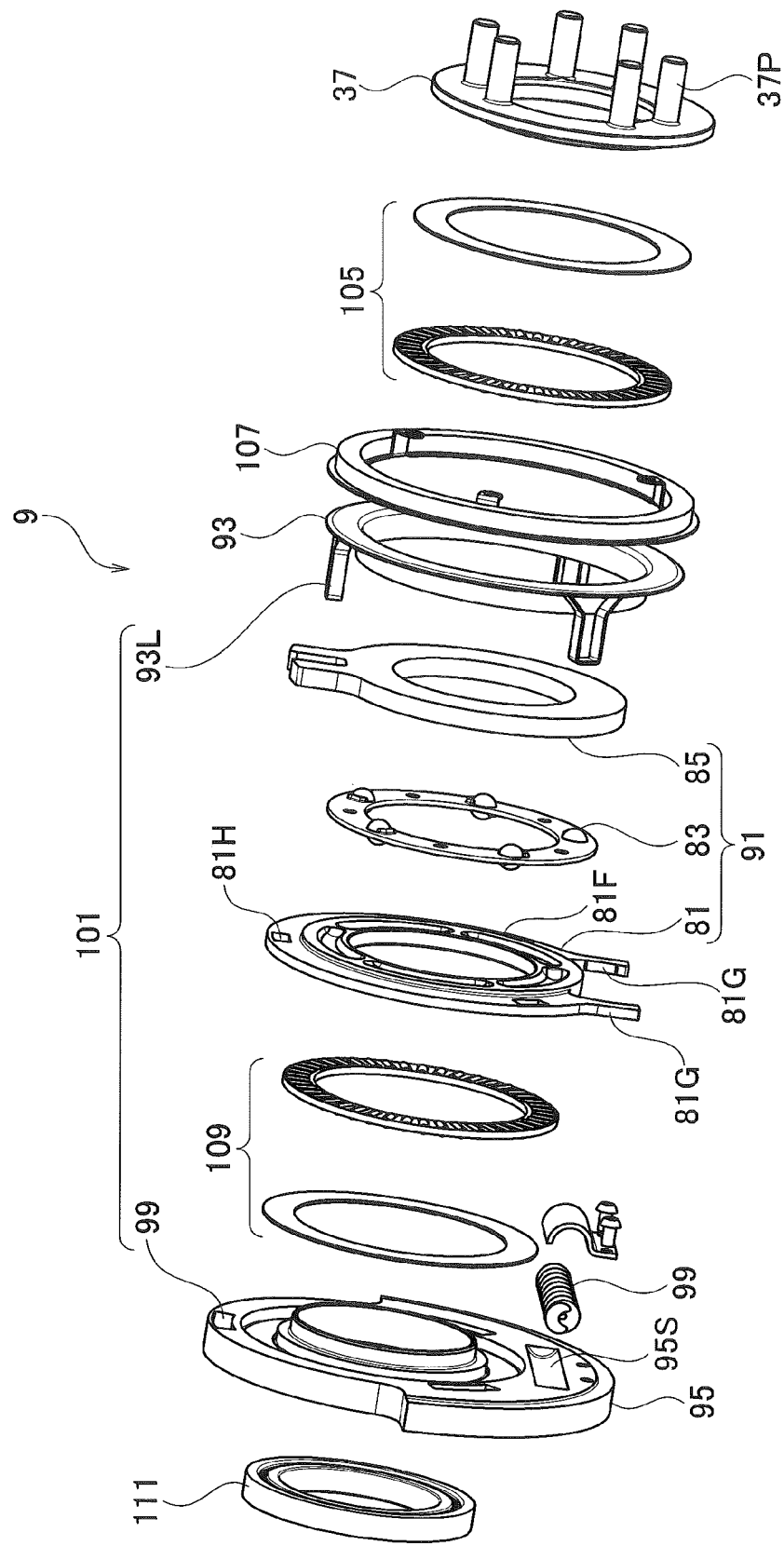
FIG. 2B is a partial exploded perspective view of the differential device, which mainly shows first and second cam mechanisms and a driver disk.

Referring to FIG. 2B in combination with FIGS. 1 and 2A, the actuator 9 is in general provided with a first cam mechanism 91 for driving the first clutch 5, the second cam mechanism 101 for driving the second clutch 7, and a driver disk 95 for putting them into action.

Any cam mechanism that creates relatively great pressure force can be applied to the first cam mechanism 91. The first cam mechanism 91 according to the example shown in the drawings is generally provided with a cam plate 81 rotatable about the axis, a plurality of cam balls 83 arranged to be axially symmetrical, and an anti-rotated counter plate 85. The cam plate 81 and the counter plate 85 are, respectively, in general ring-like or disk-like, and the cam balls 83 are put in therebetween and thus capable of rolling thereon. In place of the balls, any rollers capable of rolling, such as columns or truncated cones, are applicable, or cam projections formed on any one or both of the cam plate 81 and the counter plate 85 may be used.

The cam plate 81 has a plurality of cam faces 81F respectively corresponding to the cam balls 83 and each cam face 81F has a bottom elongated and slanted gently in the circumferential direction. In addition thereto or in place thereof, the counter plate 85 may also have corresponding cam faces. The cam plate 81 is further provided with a pair of grips 81G for coupling with the driver disk 95. The grips 81G engage with the driver disk 95 of itself or a pressing member as will be described later, thereby being driven into rotational motion.

Figure 4:
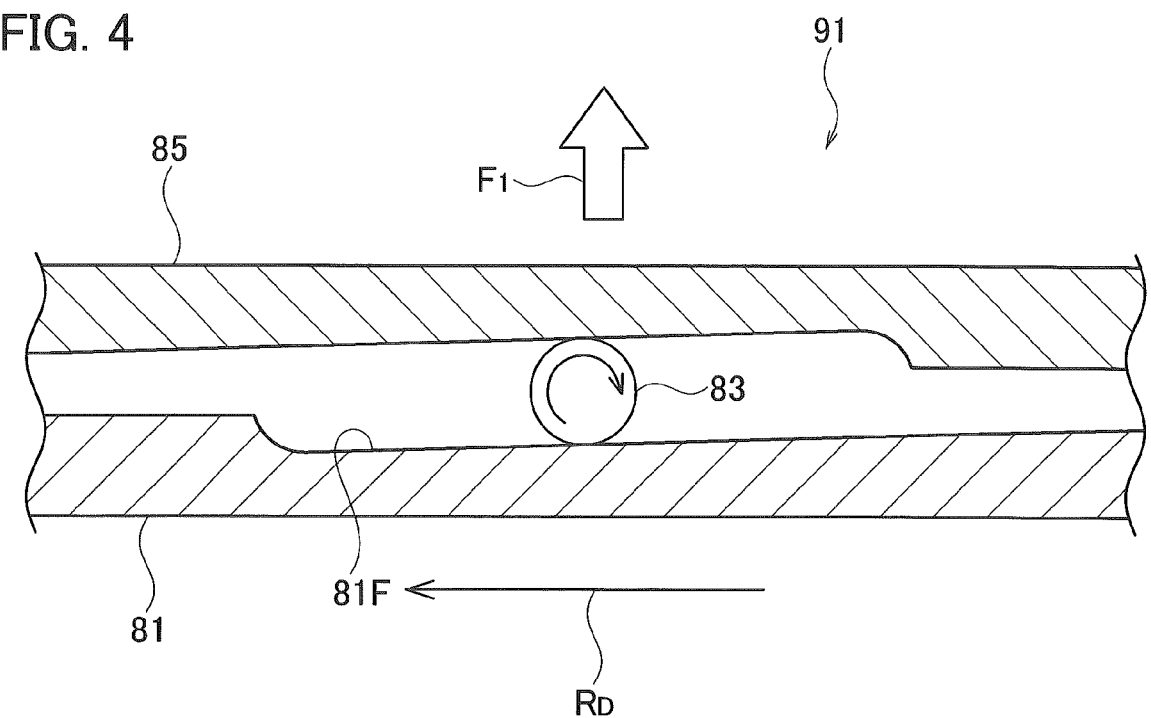
FIG. 4 is a partial sectional view of the first cam mechanism taken from a cut plane along the circumferential direction.

As best shown in FIG. 4, when the cam plate 81 is driven by the driver disk 95 and then set into a rotational motion $R_D$, the cam balls 83 roll on the cam faces 81F to go up the slanted bottoms to impart a pressure force $F_1$ to the counter plate 85.

Referring again to FIGS. 1, 2A and 2B, mainly to FIG. 2B, to serve as a mediation between the first cam mechanism 91 and the first clutch 5, a medial member 37 may be used. The medial member 37 is generally ring-like for example and is provided with a plurality of axial-symmetric projections 37P toward the first clutch 5 and the projections 37P pass through the through-holes 17 of the cover 13 to come adjacent to the pressure plate 55. To equalize the pressure forces respectively applied by the projections 37P, and to absorb relative rotation before limiting differential motion, any intervening members 103 may be interposed between the projections 37P and the pressure plate 55. The intervening members 103 are a thrust bearing and/or a ring plate for example. Further, a thrust-bearing/ring-plate 105 may be interposed also between the medial member 37 and the first cam mechanism 91.

Figure 5:
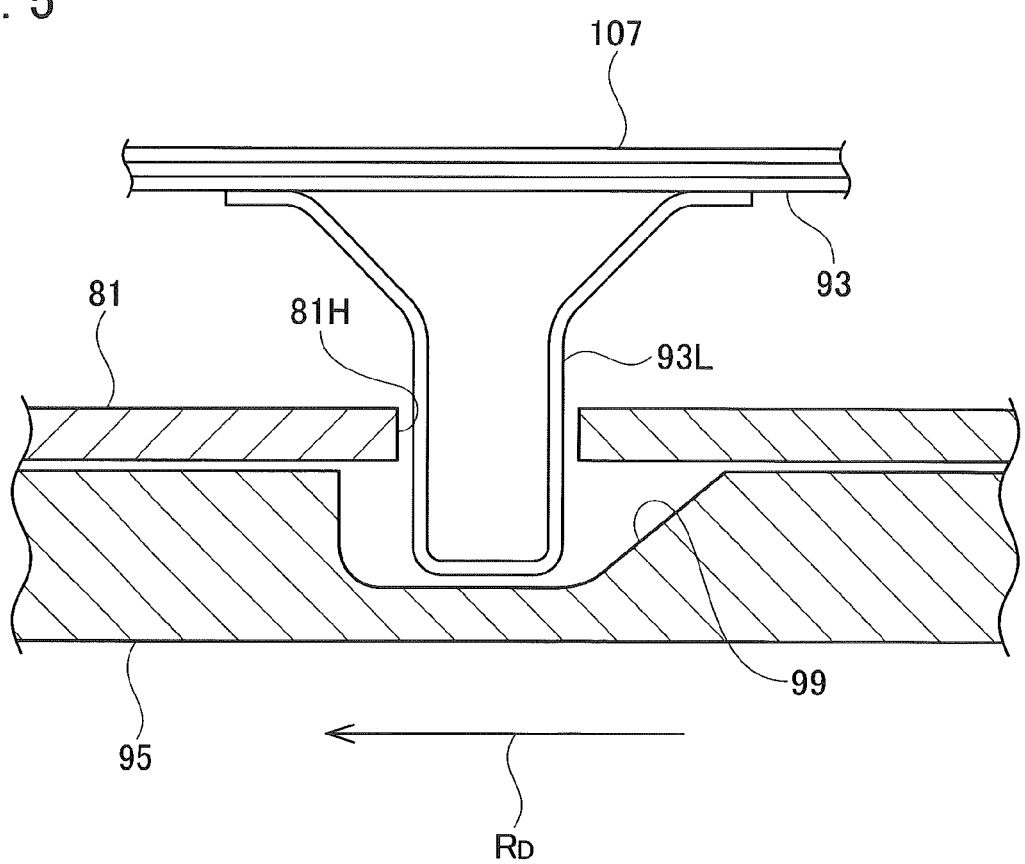
FIG. 5 is a partial sectional view of the second cam mechanism taken from a cut plane along the circumferential direction.

The actuator 9 is further provided with a second pressure plate 93, which is, although having the ring 107 interposed as described above, adjacent to the second clutch 7. The second pressure plate 93 is provided with a plurality of legs 93L extending opposite to the second clutch 7, namely toward the driver disk 95, which are as well arranged axially symmetrically. As corresponding thereto, the driver disk 95 is provided with cam faces 99, and each cam face 99, as shown in FIG. 5, includes a bottom slanted in the circumferential direction. The slope therein may be made relatively steep. The combination of the legs 93L and the cam faces 99 constitutes the second cam mechanism 101.

The cam plate 81 is, as corresponding to the legs 93L, provided with perforations 81H, and as shown in FIG. 5 the legs 93L pass through the perforations 81H to get exposed to the cam faces 99, respectively. When the driver disk 95 is in the rotational motion $R_D$ and makes a difference in rotation relative to the cam plate 81, the legs 93L follow the cam plate 81. Then, as the legs 93L slide on the cam faces 99 and go up the bottoms thereof, the second pressure plate 93 moves in the axial direction and, via the ring 107, engages the second clutch 7.

Figure 3:
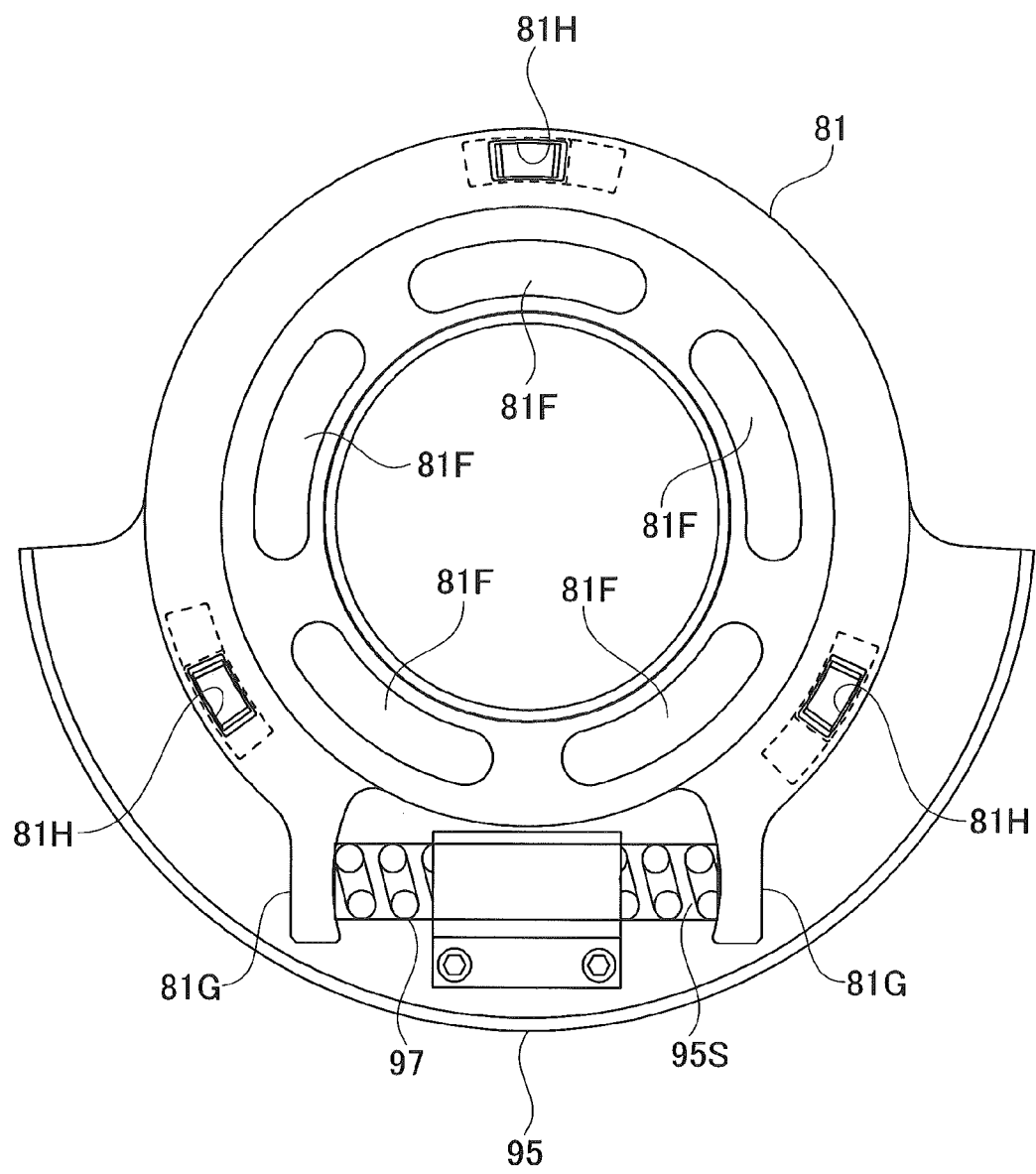
FIG. 3 is a plan view of a driver disk and a cam plate viewed in the axial direction.

Referring to FIG. 3 in combination with FIG. 2B, the actuator 9 is provided with the driver disk 95, which is laid on the cam plate 81. The driver disk 95 is generally in a shape in which a half disk nearly equal in radius to the cam plate 81 is combined with a larger half disk. The larger half may be provided with gear teeth, which are applicable to coupling with a motor at the exterior. Alternatively, the driver disk 95 may by itself constitute a rotor of the motor or, still alternatively, may be driven by any driver device other than the motor or constitute a part of the driver device. The driver disk 95 is coaxial with and rotatably supported by the casing 1. A ball bearing 111 may be used for the purpose of rotatable support.

In addition, by using the larger half, it may be combined with the pressing member 97 for driving the first cam mechanism 91. In the example shown in the drawing, the pressing member 97 is a coil spring and the driver disk 95 is provided with a semi-cylindrical hollow 95S in which the coil spring fits. Both ends of the pressing member 97 butt against, and are supported by, both ends of the hollow 95S, and further a bracket or such is applicable thereto in order to prevent displacement. In addition, both the ends of the pressing member 97 of the coil spring respectively butt against grips 81G, thereby rotating the cam plate 81 along with the driver disk 95.

Figure 6A:
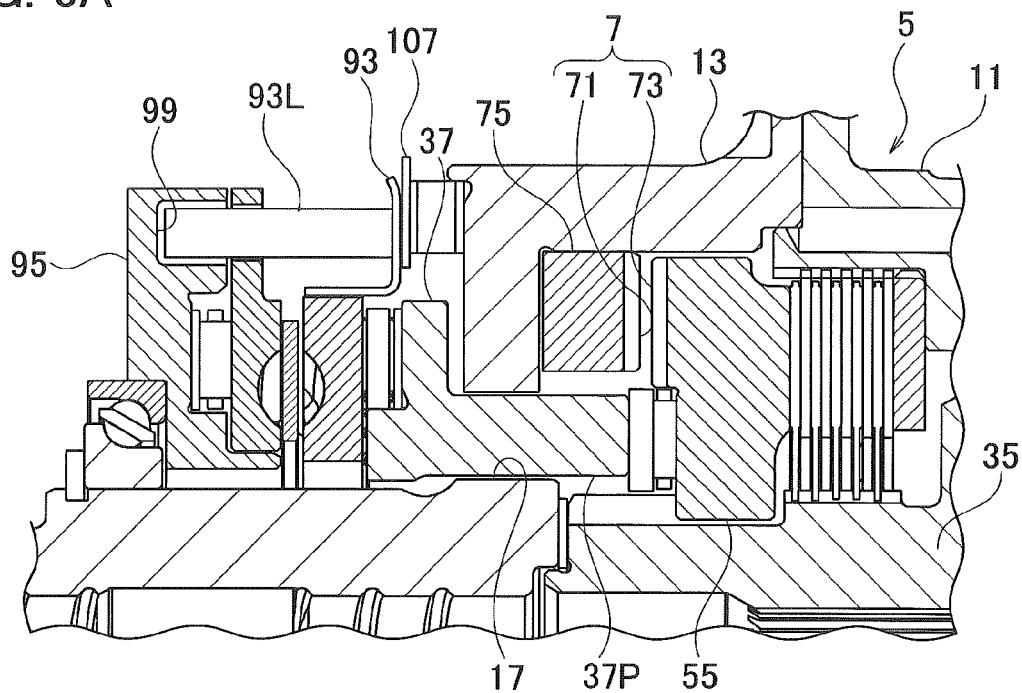
FIG. 6A is a partial elevational sectional view of the differential device, which mainly shows the first and second clutches and the first and second cam mechanisms, in a state where the first clutch becomes engaged but the second clutch has not yet gotten in mesh.

Referring mainly to FIG. 6A, while the driver disk rotates from its initial position (first position) to a certain position (second position), as the repulsive force by the coil spring overcomes the reaction force applied by the cam plate 81, the driver disk 95 rotates the cam plate 81 together and the first cam mechanism 91 exerts a pressure force in accordance with its rotational angle on the first clutch 5, thereby putting the first clutch 5 in action. The first cam mechanism 91 is beneficial to operation of the first clutch 5 which is a friction clutch, as it uses the cam balls rolling on the gently slanted faces to create a relatively large pressure force.

Figure 6B:
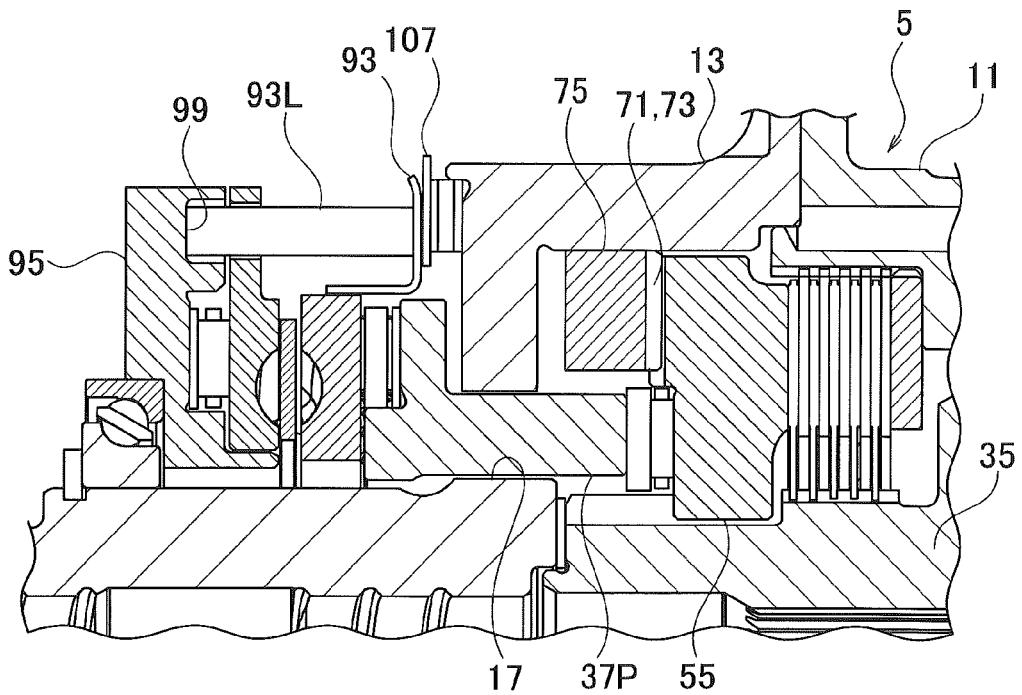
FIG. 6B is a partial elevational sectional view of the differential device, which mainly shows the first and second clutches and the first and second cam mechanisms, in a state where the second clutch becomes in mesh.

Referring mainly to FIG. 6B, when rotating beyond the second position, as the repulsive force yields to the reaction force and then the coil spring becomes compressed, a difference in rotation between the driver disk 95 and the cam plate 81 is created. As stated already, when a rotational difference is created, the legs 93L go up the cam faces 99 so that the second pressure plate 93 moves in the axial direction, thereby moving the clutch member 75 in the axial direction.

When the driver disk 95 rotates beyond the second position to reach the third position, the second clutch 7 becomes engaged. While the pressure force by the second cam mechanism 101 is weaker than that by the first cam mechanism 91, such a relatively low pressure force is sufficient because it is unnecessary to counter the reaction force. Further, as shown in FIG. 7, after engagement, side faces of the legs 77 come into contact with side faces of the through-holes 19 to retain its state; a relatively large pressure force is not required to retain the engagement.

Further, the side faces of the legs 77 and the side faces of the through-holes 19 may be correspondingly gently oblique in the circumferential direction. This structure converts a rotational motion $R_D$ of the cover 13 into a pressure force $F_2$ and is thus beneficial to retention of engagement.

While the rotational motion progresses from the second position to the third position, the cam balls 83 hardly roll over, or rather stand still, in the first cam mechanism 91. Because the cam balls 83 do not move further in depth in the cam faces, they can immediately move back to the initial positions when the driver disk 95 reverses its rotation.

The second position is determined uniquely by a balance between the repulsive force by the coil spring and the reaction force. More specifically, the second position can be arbitrarily set by regulation of a spring modulus of the coil spring, and the pressure force by the first cam mechanism 91, which determines the upper limit of the braking power by the first clutch 5, can be also arbitrarily set thereby.

According to the present embodiment, the first clutch which limits the differential motion and the second clutch which prohibits the differential motion are both put in action only by the single driver disk. As the actions thereof are controlled only by the rotational angle of the driver disk, control of the actions of the first and second clutches is readily carried out. As the first clutch in advance limits the differential motion by the time the second clutch becomes engaged, any relative rotation between these clutch teeth is eliminated and therefore engagement therebetween is not disturbed.

Although the pressing member 97 is described above as the coil spring, any other repulsive member is applicable thereto. Alternatively, in place thereof or in addition thereto, applicable is any latch mechanism or a ratchet mechanism which retains engagement from the first position to the second position and releases engagement at the second position. Still alternatively, it may be so constituted that a constitution of the cam faces, not any pressing member, delays action of the second cam mechanism behind action of the first cam mechanism.

Although certain exemplary embodiments are described above, modifications and variations of the embodiments will occur to those skilled in the art, in light of the above teachings.

The invention claimed is:

1. A differential device, comprising:
an input member arranged to receive torque to rotate about an axis;
a gear set including output gears rotatable about the axis, the gear set being so coupled with the input member as to mediate transmission of the torque from the input member to the output gears while allowing differential motion between the output gears;
a first clutch so coupled with the input member and one of the output gears as to limit the differential motion;
a first pressure plate axially adjacent to the first clutch and axially movable to press on the first clutch;
a first cam mechanism adjacent to a medial member to press the first pressure plate toward the first clutch;
a second clutch that, when connected, drivingly connects the one of the output gears with the input member;
a second pressure plate axially adjacent to a ring and a clutch member, the second pressure plate being axially movable to cause first clutch teeth and second clutch teeth of the second clutch to engage with each other; and
a driver disk rotationally movable from a first position via a second position to a third position, the driver disk including a pressing member so coupled with the first cam mechanism as to, from the first position to the second position, rotate the first cam mechanism along with the driver disk and to, from the second position to the third position, allow the first cam mechanism to create rotational difference relative to the pressing member, wherein the driver disk in combination with the second pressure plate forms a part of a second cam mechanism for driving the second clutch.

2. The differential device of claim 1, wherein the second clutch includes the first clutch teeth engaging in a circumferential direction with the input member and movable axially, and the second clutch teeth coupled with the one of the output gears and engaging with the first clutch teeth, and the second clutch teeth are formed in a unitary body with the first pressure plate.

3. The differential device of claim 1, wherein the second pressure plate includes a leg extending toward the driver disk and the driver disk includes a cam face in contact with the leg, the cam face being so dimensioned as to, in response to the rotational motion from the second position to the third position, press the leg to move the second pressure plate toward the second clutch.

4. The differential device of claim 1, wherein the first cam mechanism includes a cam plate drivingly engaging with the pressing member and a cam ball rolling on the cam plate in response to the rotational motion to create a pressure force in an axial direction.

5. The differential device of claim 1, wherein the input member includes a casing housing the gear set, wherein the first cam mechanism, the second cam mechanism, and the driver disk are disposed outside the casing, and wherein the casing includes a first through-hole communicating the first cam mechanism with the first clutch and a second through-hole communicating the second cam mechanism with the second clutch.

6. The differential device of claim 5, wherein the second clutch includes an arm fitting in the second through-hole, and a side face of the arm and a side face of the second through-hole are circumferentially oblique so as to convert rotation of the casing into a force to retain engagement of the second clutch.

7. The differential device of claim 1, wherein the first clutch includes a first friction plate drivingly coupled with the input member and a second friction member drivingly coupled with the one of the output gears, and the first friction plate and the second friction plate are so disposed as to be pressed by the first pressure plate to frictionally mutually limit rotation relative to each other.

* * * * *